(No Model.) 2 Sheets—Sheet 1.
H. BAUM.
STOP VALVE OR STOP VALVE MECHANISM.

No. 493,806. Patented Mar. 21, 1893.

Witnesses:
H. G. Dieterich.
B. W. Sommers.

Inventor
Hugo Baum,
By [signature] Atty (No Model.) 2 Sheets—Sheet 2.
H. BAUM.
STOP VALVE OR STOP VALVE MECHANISM.

No. 493,806. Patented Mar. 21, 1893.

Witnesses
H. G. Dieterich
B. W. Sommers

Inventor:
Hugo Baum
By
Atty

UNITED STATES PATENT OFFICE.

HUGO BAUM, OF BERLIN, GERMANY.

STOP-VALVE OR STOP-VALVE MECHANISM.

SPECIFICATION forming part of Letters Patent No. 493,806, dated March 21, 1893.

Application filed June 16, 1892. Serial No. 436,931. (No model.) Patented in Germany March 8, 1891, No. 62,848.

*To all whom it may concern:*

Be it known that I, HUGO BAUM, director, a subject of the King of Prussia, residing at Berlin, German Empire, have invented certain new and useful Improvements in and Relating to Stop-Valves or Stop-Valve Mechanisms, (for which I have obtained Letters Patent in Germany, No. 62,848, dated March 8, 1891;) and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention has relation to stop valves or stop valve mechanisms more especially designed for use on or with holders for gases of high pressure, as for instance the flasks for storing carbonic acid, and it has for its object a construction whereby the dimensions of the valve casing and valve stem, and consequently the protecting cap usually employed to protect these stop valves against injury are very materially reduced, and whereby the danger of injury to the valve, its weight, prime cost, and the cost of transportation are materially lessened.

To these ends the invention consists in structural features and in combinations of parts as will now be fully described, and as shown in the accompanying drawings, in which—

Figure 1:
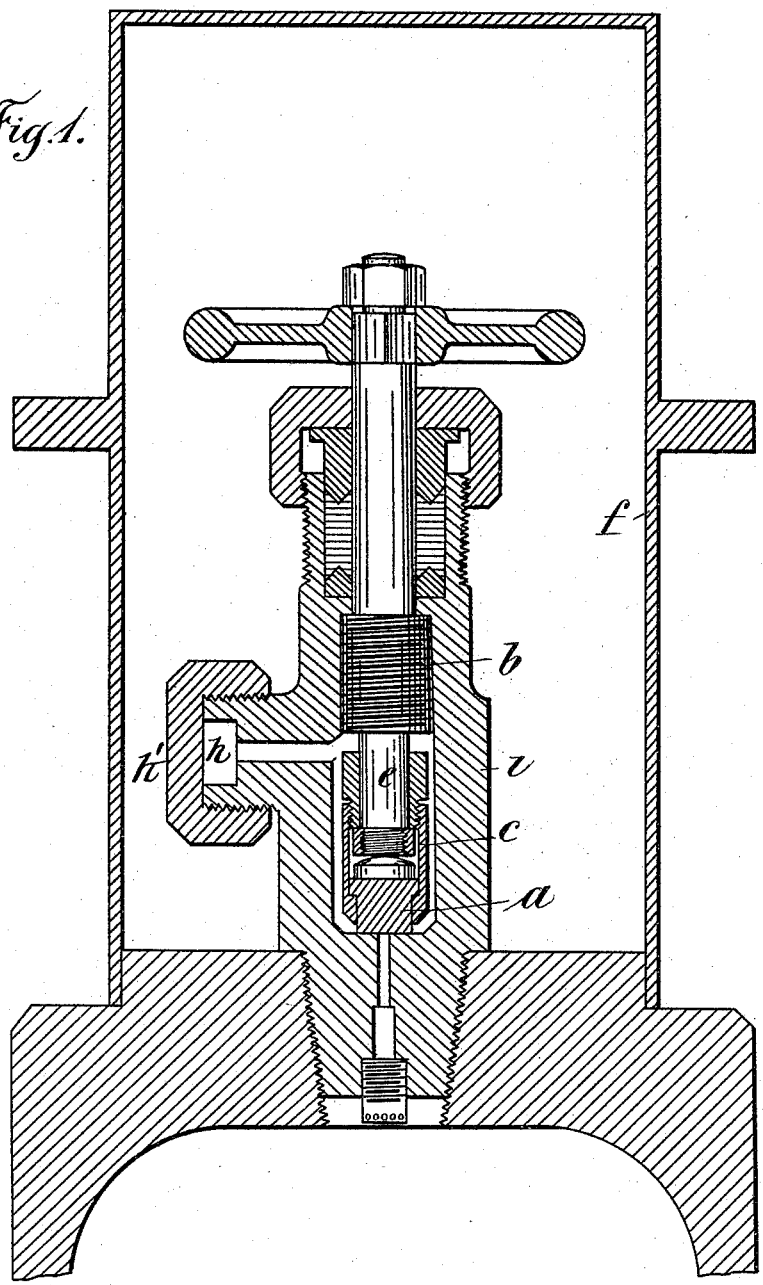
Figure 2:
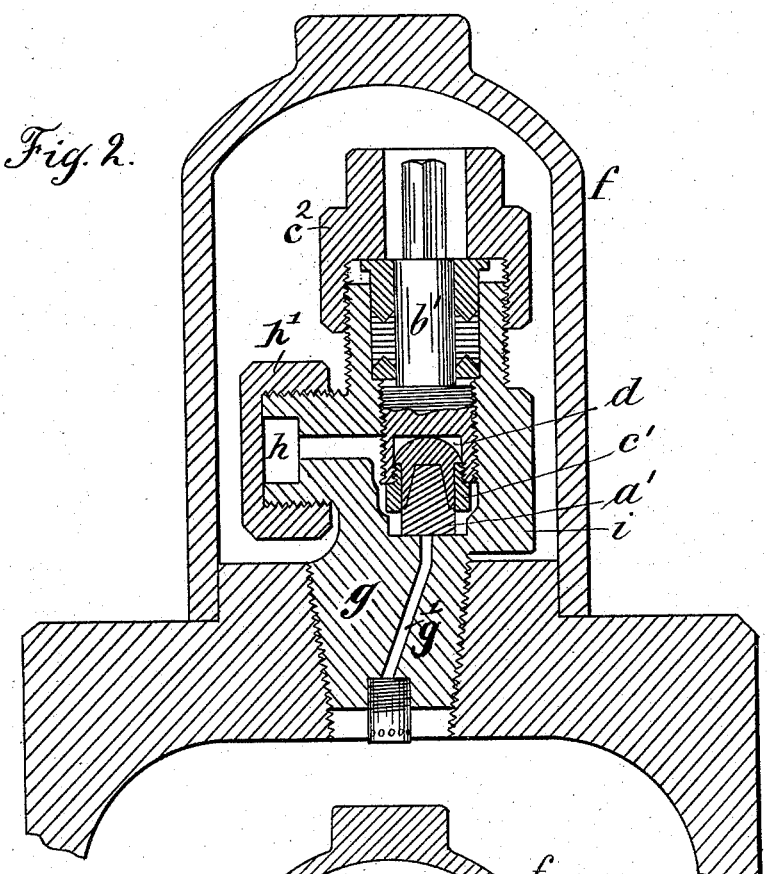

Figure 1 is a vertical section partly in elevation of a stop valve as heretofore constructed and used on or with carbonic acid flasks. Fig. 2 is a like view of a valve constructed according to my invention, and Fig. 3 is also a vertical sectional elevation of a modification in the construction of the stop valve.

In all of the above figures the carbonic acid flask is shown in part only, and it will be understood that the use of my improved stop valve is not limited to such flasks.

One of the essential features of construction whereby a material reduction in the space occupied by the stop valve is attained, consists in the longitudinal or vertical axis of the valve casing not coinciding with the like axis of the inlet branch, so that the outlet branch which lies in a plane at right angles to the longitudinal axes of the casing and inlet branch, is brought closer to the said inlet branch, whereby a considerable reduction in the space occupied by the stop valve casing in a horizontal direction is effected, since the diameter of the valve casing through the outlet branch is nearly equally divided by a line drawn through the longitudinal axis of the inlet branch of the casing, consequently a protecting cap, $f$, of considerably less diameter can be used. There are other features of construction whereby the length of the valve casing is also materially reduced, which features will be described hereinafter.

Figure 3:
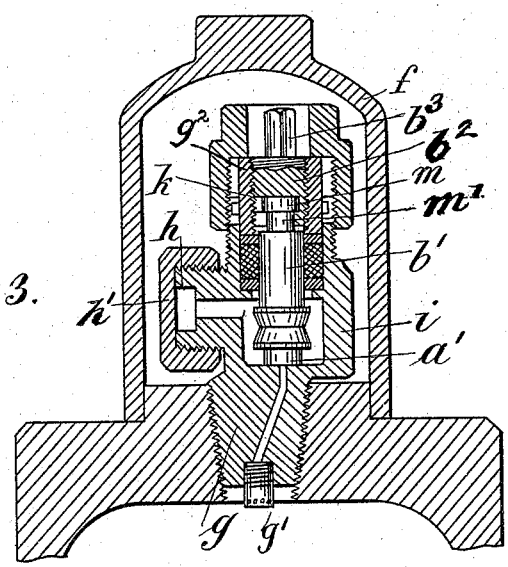

As shown in Figs. 2 and 3, the inlet branch is so arranged relatively to the valve casing that the longitudinal axis of said branch, although parallel with the like axis of the casing will lie in a plane eccentric to said axis of the casing, the inlet passage, $g'$, in the branch being correspondingly inclined from the center of its outer face to the center of the valve casing, on which is formed the outlet or coupling branch, $h$, normally closed by a screw-cap, $h'$. The valve stem, $b'$, Fig. 2, is also considerably shorter than that of like valves of usual construction shown in Fig. 1, and this shortening of the valve stem is attained by the construction and relative arrangement of the valve, $a'$, which is held in an exteriorly screw-threaded sleeve, $c'$, to which the valve stem, $b'$, is screwed, said valve stem having a socket, $d$, formed in its lower end for the reception of the head of the valve, $a'$. The lower portion of the valve stem, $b'$, is enlarged and screw-threaded exteriorly, while the upper portion of the stem extends through a suitable packing interposed between a packing ring and a stuffing box gland, the packing being compressed by a screw cap screwing on the valve casing as usual. The bore of the screw cap, $c^2$, is enlarged and the upper end of the valve stem which is squared, projects into this cap, so that a key may be applied to the stem for displacing the valve, $a'$, the usual hand wheel, Fig. 1, being dispensed with, whereby the height of the valve casing, $i$, and consequently of the protecting cap, $f$, is considerably lessened, while the outer interiorly screw-threaded valve retaining sleeve, $c$, and its connecting sleeve, Fig. 1, are also dispensed with or replaced by the exteriorly screw-threaded and much shorter sleeve, $c'$, Fig. 2, the employment of which is rendered possible by socketing the lower end of the valve stem, $b'$, so that the latter is shortened to the extent of the lower part, $e$, of valve stem, $b$, Fig. 1, irrespective of the shortening of the upper portion of said stem, $b'$, relatively to that of stem, $b$.

As shown in Fig. 3, the valve casing may be made still more compact than that described in reference to Fig. 2. The construction shown in Fig. 3 differs from that shown in Fig. 2, in the connection of the valve spindle, $b'$, with the valve, in the length of said spindle, and in the construction of the stuffing box through which the spindle passes. As shown the valve spindle, $b'$, is made in two parts; the lower portion extends through the stuffing box, and its upper end is of reduced diameter, as shown at $m'$, and terminates in a cylindrical head, $m$, said head, $m$, and throat or reduced portion, $m'$, fitting into a correspondingly shaped slot, $k$, formed in the exteriorly threaded upper portion, $b^2$, of the stem that is screwed into the stuffing box gland, $g^2$, and has the squared stem, $b^3$, for manipulating the valve stem and valve.

By the last described construction the diameter of the valve casing at the outflow branch, $h$, as well as the length of the casing are reduced to such an extent as to require a very small protecting cap, $f$, as compared with the cap shown in Fig. 1, or even with the cap shown in Fig. 2.

My improved stop valve or valve mechanism is not only lighter, but less liable to injury, even without a protecting cap, than the valves or valve mechanism shown in Fig. 1.

Having thus described my invention, what I claim as new therein, and desire to secure by Letters Patent, is—

1. A stop valve comprising a barrel terminating at one end in an inlet branch parallel with but eccentric to the barrel, said inlet branch provided with an inlet passage having its initial and terminal centrally of said inlet branch and barrel respectively, an outlet branch at right angles to the barrel above the inlet passage and a valve seated in the barrel and controlling the flow of fluid through said inlet passage.

2. The combination with a vessel provided with a boss or projection having an interiorly threaded passage and a cap seated on said boss, of a stop valve comprising a barrel terminating at one end in an exteriorly threaded inlet branch screwing into the passage of the vessel, said inlet branch parallel with but eccentric to the barrel and provided with an inlet passage having its initial and terminal centrally of the inlet branch and barrel respectively, a short outlet branch at right angles to the barrel above the inlet passage, said outlet branch screw-threaded exteriorly, and a valve contained in the barrel and controlling the flow of fluid through the inlet passage, substantially and for the purpose set forth.

3. A stop valve comprising a short barrel terminating in an inlet branch parallel with but eccentric to said barrel, said inlet branch provided with an inlet passage having its initial and terminal centrally of the inlet branch and barrel respectively, a short outlet branch above said inlet passage at right angles to the barrel and a valve comprising a valve spindle working fluid tight in the barrel, an actuating screw plug detachably connected with the valve spindle, an interiorly threaded sleeve loosely seated in the barrel in which sleeve said screw plug works, and a locking sleeve connected with the barrel and bearing on said screw plug, substantially as and for the purpose set forth.

4. A stop valve comprising a barrel, $i$, terminating in an inlet branch, $g$, parallel with but eccentric to said barrel, said inlet branch provided with an inlet passage having its initial and terminal centrally of the inlet branch and barrel respectively, an outlet branch at right angles to the barrel, packing rings and a packing interposed between them arranged in the barrel, a valve whose spindle extends through said packing rings and packing, a screw plug, $b^2$, detachably connected with the valve spindle and provided with a stem of polygonal form in section, an interiorly threaded gland, $g'$, loosely seated on the upper packing ring in which gland said screw plug works, and a retaining sleeve, $c^2$, detachably connected with the barrel said sleeve having bearing on the outer end of gland, $g^2$, and inclosing the stem of the screw plug, substantially as and for the purpose set forth.

HUGO BAUM.

Witnesses:
RICHARD SCHMIDT,
RICHARD FONSCHER.